United States Patent [19]

Kabe et al.

[11] Patent Number: 4,657,058
[45] Date of Patent: Apr. 14, 1987

[54] PNEUMATIC TIRE

[75] Inventors: Kazuyuki Kabe, Hiratsuka; Tuneo Morikawa, Hadano; Shuichi Tsukada, Hiratsuka, all of Japan

[73] Assignee: The Yokohama Rubber Co., Ltd., Tokyo, Japan

[21] Appl. No.: 726,700

[22] Filed: Apr. 24, 1985

[30] Foreign Application Priority Data

Apr. 27, 1984 [JP] Japan ................... 59-84035

[51] Int. Cl.$^4$ ................................. B60C 9/08
[52] U.S. Cl. ....................... 152/556; 152/560; 152/564
[58] Field of Search ............... 152/451, 458, 556, 558, 152/564, 548, 560, 527; 57/902

[56] References Cited

U.S. PATENT DOCUMENTS

| | | | |
|---|---|---|---|
| 3,638,706 | 2/1972 | Wilson et al. | 152/451 X |
| 3,851,692 | 12/1974 | Takemura et al. | 152/556 X |
| 3,977,172 | 8/1976 | Kerawalla | 57/902 X |
| 4,155,394 | 5/1979 | Shepherd et al. | 152/556 X |
| 4,177,852 | 12/1979 | Merli et al. | 152/556 X |
| 4,286,645 | 9/1981 | Boileau | 152/558 X |
| 4,328,324 | 5/1982 | Kock et al. | 152/451 X |
| 4,389,839 | 6/1983 | Van der Werff | 152/556 X |

FOREIGN PATENT DOCUMENTS 49120303 11/1974 Japan .
5843802 3/1983 Japan ................... 152/556

Primary Examiner—Donald Czala
Assistant Examiner—Ramon R. Hoch
Attorney, Agent, or Firm—Finnegan, Henderson, Farabow, Garrett & Dunner

[57] ABSTRACT

A pneumatic tire of which the durability of the turnup portions of a carcass layer is greatly improved. The tire consists of left and right bead portions, left and right side wall portions continuing from the bead portions, a tread positioned between the side wall portions, a carcass layer provided between the left and right bead portions so that a cord angle with respect to the circumferential direction the tire is 70°–90°, and a belt reinforcement layer provided between the tread and carcass layer, characterized in that the carcass layer is formed by burying 20–60 aromatic polyamide fiber cords of 0.55–0.65 mm in diameter per 5 cm of the carcass layer in an equatorial plane in the tire in rubber coats of which a 100% modulus is 30–70 kg/cm$^2$.

3 Claims, 4 Drawing Figures

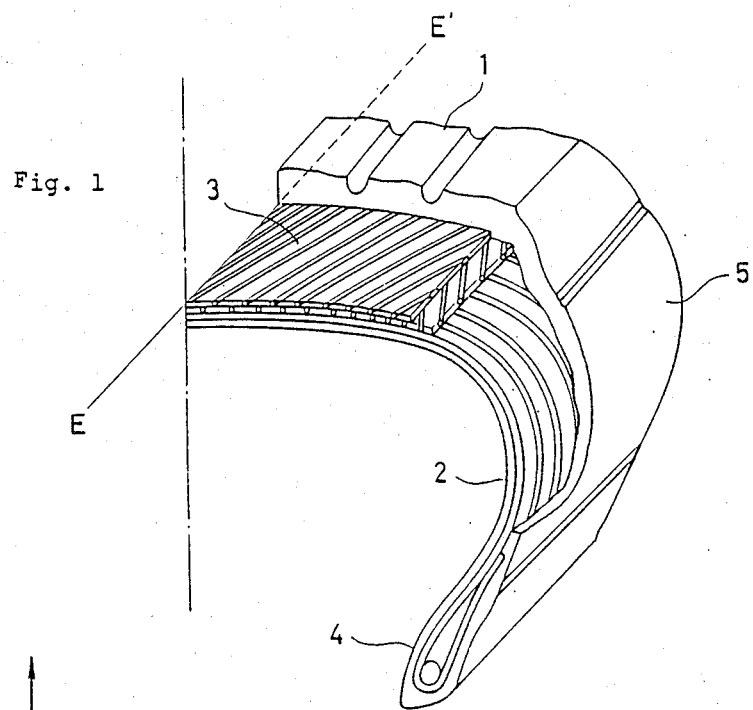
Fig. 1
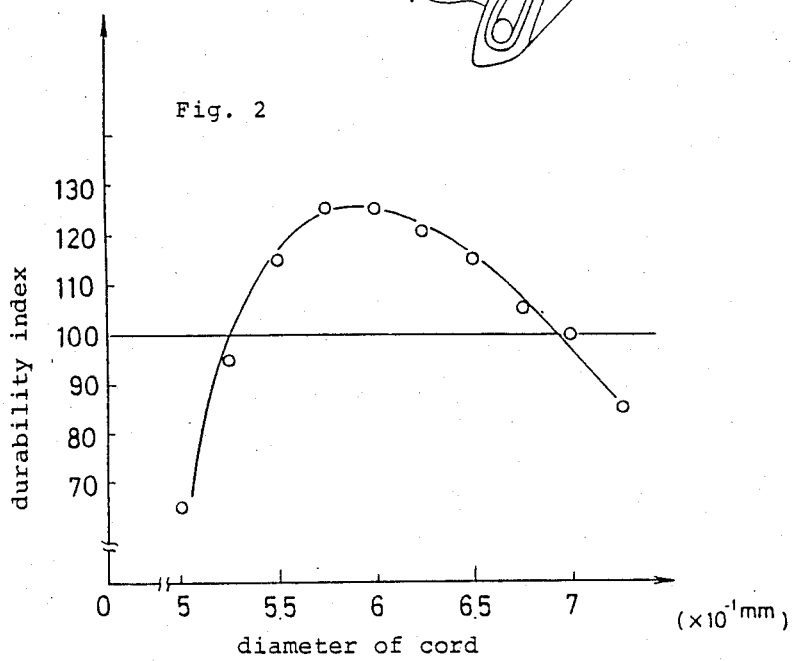
Fig. 2
Fig. 3
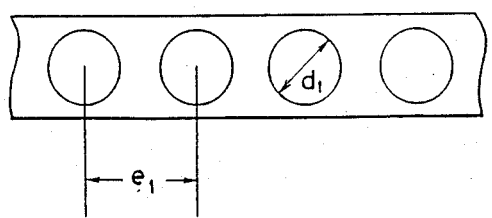
Fig. 4
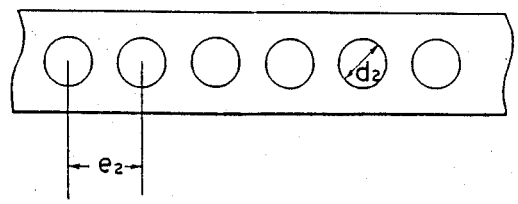

PNEUMATIC TIRE

FIELD OF THE INVENTION

This invention relates to a pneumatic tire having improved durability, especially, at the turnup portions of a carcass layer therein.

In FIG. 1, a pneumatic tire to which the invention applies is shown. A numeral reference to 1 is a tread. 2 is a carcass layer provided between left and right bead portions 4, having a cord angle of 70° to 90° in respect to the circumferential direction of the tire. In the tread 1, a belt reinforcement layer 3 is provided so as to surround the outer circumference of the carcass layer 2. A numeral reference to 5 is a left or right sidewall portion continuing from the left or right bead portion 4. The carcass layer 2 is turned up around the bead portions 4. Reference letters EE' denote the circumferential direction of a tire.

The cords in a carcass layer 2 in a conventional pneumatic tire consist of organic fiber, such as nylon, rayon and polyester. These fibers, in general, have a tensile strength of 5 to 10 g/d. They are not considered to be so strong.

Japanese patent A publication (unexamined) No. 120303/74 teaches use of aromatic polyamide fibers having a tensile strength of not less than 10 g/d as material for carcass cord.

Aromatic polyamide fiber is very strong compared with material for conventional carcass cords. Accordingly, when aromatic polyamide fiber cords are used, the number of plies of a conventional carcass layer which requires two plies can be reduced to one ply thereby increasing productivity. Aromatic polyamide fibers, however, are highly crystalline by the molecular structure and therefore are difficult to adhere to the rubber coat. Moreover when the aromatic polyamide fiber cords are used, separation (a phenomenon of separation of cords and the rubber coat from each other) readily occurs at the ends of the turnup portions of the carcass layer.

Under the circumstances, a strong and durable pneumatic tire has not yet been proposed.

SUMMARY OF THE INVENTION

An object of the present invention is to provide a pneumatic tire with a more durable carcass layer, especially, the turnup portions of the carcass layer.

The invention relates to a pneumatic tire which comprises (1) left and right bead portions, (2) left and right side wall portions continuing from the respective bead portions, (3) a tread positioned between the side wall portions, (4) a carcass layer provided between the left and right bead portions, having a cord angle of 70 to 90 degree at the circumferential direction of the tire, and (5) a belt reinforcing layer provided between the tread and the carcass layer, the carcass layer comprising 20 to 60 cords, per 5 cm of the carcass layer in the equatorial plane of the tire, of aromatic polyamide fibers, having a diameter of 0.55 to 0.65 mm, and (4-2) a rubber coating into which the cords have been embedded, having a 100% modulus of 30 to 70 kg/cm².

The invention provides a pneumatic tire with an unexpectedly improved effect in respect to durability of the tire and in particular durability in the turnup portions in the carcass layer.

The invention will be illustrated below with reference to preferred embodiments.

BRIEF DESCRIPTION OF THE DRAWINGS

FIG. 1 shows a pneumatic tire in partial sectional view;

FIG. 2 is a diagram showing the relation between the diameter of carcass cords and the durability of the tire;

FIG. 3 is a sectional view of a carcass layer in a conventional tire; and

FIG. 4 is a sectional view of a carcass layer in a tire according to the present invention.

DESCRIPTION OF THE PREFERRED EMBODIMENT

The construction of the present invention will now be described in detail.

(1) An aromatic polyamide fiber cord used in the present invention is obtained by twisting the aromatic polyamide fiber, which has a tensile strength of not less than 150 kg/mm² and a Young's modulus of not less than 3000 kg/mm², in such a manner that a value of a twist constant K expressed by the following formula is $1500 \leq K \leq 3500$, into a cord, and subjecting the cord to heat treatment for adhesion.

$$K = T\sqrt{D}$$

wherein K is a twist constant, T the number of cord-twisting times (time/10 mm), and D a total denier of the cord.

In order to improve a resistance to the bending fatigue of the cord, it is most preferable that $2800 \leq K \leq 3400$.

As is clear from the following table, aromatic polyamide fiber is superior in the strength to organic fiber, such as nylon, rayon and polyester, which are used for the production of conventional carcass cords.

|  | Aromatic polyamide fiber | Polyester | 6(6-6) nylon | Rayon |
|---|---|---|---|---|
| Strength (raw yarn) | 22 g/d | 9 g/d | 9 g/d | 6 g/d |

(2) The above aromatic polyamide fiber cord has a diameter of 0.55–0.65 mm.

Cords of a smaller diameter improve the durability of the carcass layer more effectively. However, the rigidity of the carcass layer per unit width thereof cannot be reduced to an unduly low level since strength of the carcass layer must be kept sufficiently high. As a result, a diameter of the carcass cord is naturally restricted.

Tires provided with carcass cords of various diameters (the tensile rigidity of the cords per unit width of the carcass layer in the direction of the cords in all of the tires is substantially equal) were subjected to an indoor durability test. The test conditions included a tire size of 195/70HR14, rim of 5½ JJ×14, air pressure of 2.1 kg/cm², drum diameter of 1707 mm, rotational speed of 80 km/hr and initial load of 525 kg. The load is increased by 50 kg every 2 hours. The results of this test are shown in FIG. 2.

In FIG. 2, the abscissa indicates a diameter of the cord and the ordinate shows a durability index. It is understood from FIG. 2 that, when the diameter of the cords is in the range of 0.55–0.65 mm, a tire the durability of which is not lower than that of a conventional tire can be obtained, and that, especially, when the diameter of the cords is 0.57–0.63 mm, the durability of the tire can be improved markedly, i.e., to not less than 120 (index) in comparison with that of the cords having a diameter of 0.7 mm, employed as the conventional tire cords.

(3) The rubber coat to embed the carcass cords thereinto has a 100% modulus of 30 to 70 kg/cm$^2$.

When the 100% modulus of the rubber coating is less than 30 kg/cm$^2$, the durability of the carcass layer decreases since the modulus of the aromatic polyamide fiber cords is high. On the other hand, when the 100% modulus of the rubber coating exceeds 70 kg/cm$^2$, the rubber coating becomes too hard, so that the productivity of the tire gets down.

(4) According to the present invention, 20–60 aromatic polyamide fiber cords per 5 cm of the carcass layer in the equatorial plane of the tire are embedded in the rubber coating to form a carcass layer. The reasons are as follows.

Bending rigidity (when it is high, separation occurs easily at the cord ends) of the cords with respect to the bending deformation thereof will now be discussed in relation to the general bending deformation of a tire, especially, the bending deformation of the side wall portions of a tire, which occurs when the tire rotates as it contacts the ground surface, and with reference to FIG. 3, a sectional view of a carcass layer (of a conventional structure) taken at right angles to the direction in which the cords extend, and FIG. 4, a sectional view of a carcass layer (of a structure according to the present invention) taken at right angles to the direction in which the cords extend. When the distance between the center of the cord and the outer surface of the cord is large, a large strain occurs more easily on the outer surface of the cord.

The bending rigidity D is defined by the formula of multiplication of the moment of inertia of area, I, using the tensile rigidity E.

$$D = EIn \quad (E_1 = E_2 = E, \text{ the same material}) \quad (1)$$

wherein n is the number of ends.

$$I_1 = \pi d_1^4/64 \text{ in FIG. 3 and}$$

$$I_2 = \pi d_2^4/64 \text{ in FIG. 4} \quad (2)$$

When n1 and n2 are the numbers of cord ends per a certain width of a carcass layer, distances e1, e2 between the cords are defined by the following formulae.

$$e_1 = 1/n_1, \ e_2 = 1/n_2 \quad (3)$$

If the tensile rigidities of the cords shown in FIGS. 3 and 4, per unit width of the carcass layers in the direction of the cords are constant, the following equation can be established.

$$EA_1 n_2 = EA_2 n_2$$

Since $A_1 = \pi d_1^2/4$ and $A_2 = \pi d_2^2/4$, the above equation can be changed into the following.

$$d_1^2 = d_2^2 n_2 \text{ or } n_2/n_1 = (d_1/d_2)^2 \quad (4)$$

When m is a ratio of the bending rigidity of the cords of FIG. 3 to that of the cords of FIG. 4, the m can be expressed by the following formula (5).

$$m = \frac{D}{D_1} = \frac{EI_2 n_2}{EI_1 n_1} = \frac{I_2 n_2}{I_1 n_1} = \frac{\frac{\pi d_2^4}{64} n_2}{\frac{\pi d_1^4}{64} n_1} = \quad (5)$$

$$\left(\frac{d_2}{d_1}\right)^4 \frac{n_1}{n_2} = \left(\frac{d_2}{d_1}\right)^4 \left(\frac{d_1}{d_2}\right)^2 = \left(\frac{d_2}{d_1}\right)^2$$

Even if a tensile rigidity of cords is kept constant, a bending rigidity may be varied. The bending rigidity shows how separation will be easy to take place. If d2 is smaller d1, the reaction can accordingly be reduced. This reduces the possibility of separation. However, there is naturally a limit to the reduction of the diameter of the cords; if the cords buried and embedded in parallel with one another contact the adjacent cords, they could be broken.

In view of the above, the number of the cords used in the tire according to the present invention is set to 20–60 per 5 cm of the carcass layer in the equatorial plane in the tire. When this number is less than 20, the rubber coating flows out easily from the space between the cords. When this number is more than 60, the entry of the rubber coating into the space between the cords is prevented, and an adhesion strength between the cords and the rubber decreases. This further decreases the durability of the carcass layer, and an increase in the tire-manufacturing cost. Therefore, the optimum number of cords per 5 cm of the carcass layer in the equatorial plane in the tire is 25–40.

The embodiments of the invention in which an exclusive property or privilege is claimed are defined as follows:

1. In a pneumatic tire having a tread portion, right and left bead portions and right and left side wall portions extending between the tread and bead portions, a carcass cord layer extending between the right and left bead portions in which the cords in the layer are at an angle of 70 to 90 degrees with respect to the circumferential direction of the tire, and a belt reinforcing layer disposed between the tread portion of the tire and the carcass cord layer, the improvement comprising said carcass cord layer comprising from 20 to 60 cords per 5 cm of the carcass layer in the equatorial plane of the tire, said cords being aromatic polyamide fiber cords having a diameter of from 0.55 to 0.65 mm, and being embedded in a rubber coating having a 100% modulus of 30 to 70 kg/cm$^2$.

2. The pneumatic tire of claim 1, in which the number of the cords in the carcass cord layer is from 25 to 40 per 5 cm of the carcass layer in the equatorial plane of the tire, with each of the cords having a diameter of from 0.57 to 0.63 mm.

3. The pneumatic tire of claim 1, in which the cords of the carcass cord layer have a tensile strength of at least 150 kg/cm$^2$, a Young's modulus of at least 3000 kg/mm$^2$ and a twisting constant of from 1500 to 3000.

* * * * *